United States Patent
Waltermann et al.

(10) Patent No.: US 9,071,524 B2
(45) Date of Patent: Jun. 30, 2015

(54) NETWORK BANDWIDTH CONTROL FOR NETWORK STORAGE

(75) Inventors: Rod D Waltermann, Rougemont, NC (US); Howard Locker, Cary, NC (US); Joseph Michael Pennisi, Apex, NC (US); Mark Charles Davis, Durham, NC (US)

(73) Assignee: Lenovo (Singapore) Pte, Ltd., Singapore (SG)

( * ) Notice: Subject to any disclaimer, the term of this patent is extended or adjusted under 35 U.S.C. 154(b) by 1770 days.

(21) Appl. No.: 12/059,968

(22) Filed: Mar. 31, 2008

(65) Prior Publication Data

US 2009/0248845 A1 Oct. 1, 2009

(51) Int. Cl.
| | | |
|---|---|---|
| G06F 15/173 | (2006.01) | |
| H04L 12/801 | (2013.01) | |
| H04L 12/919 | (2013.01) | |
| H04L 12/927 | (2013.01) | |
| H04L 12/931 | (2013.01) | |
| H04L 29/08 | (2006.01) | |

(52) U.S. Cl.
CPC .............. *H04L 47/10* (2013.01); *H04L 47/765* (2013.01); *H04L 47/803* (2013.01); *H04L 49/356* (2013.01); *H04L 67/1097* (2013.01)

(58) Field of Classification Search
USPC .................. 709/212, 216, 217, 219, 225, 224
See application file for complete search history.

(56) References Cited

U.S. PATENT DOCUMENTS

| | | | |
|---|---|---|---|
| 5,675,800 A * | 10/1997 | Fisher et al. .................... 713/2 |
| 6,374,296 B1 * | 4/2002 | Lim et al. ..................... 709/225 |
| 6,683,883 B1 | 1/2004 | Czeiger et al. | |
| 6,763,419 B2 | 7/2004 | Hoese et al. | |
| 6,857,069 B1 | 2/2005 | Rissmeyer et al. | |
| 6,895,461 B1 | 5/2005 | Thompson | |
| 7,095,786 B1 * | 8/2006 | Schonfeld et al. ........ 375/240.16 |
| 7,119,811 B2 * | 10/2006 | Ernst et al. ..................... 345/545 |
| 7,406,522 B2 * | 7/2008 | Riddle ........................... 709/226 |
| 7,480,237 B2 * | 1/2009 | Nolle et al. .................... 370/229 |
| 7,493,407 B2 * | 2/2009 | Leedom et al. ............... 709/232 |
| 7,590,775 B2 * | 9/2009 | Gildfind et al. ................ 710/29 |
| 7,685,281 B1 * | 3/2010 | Saraiya et al. ................ 709/226 |
| 7,908,410 B2 * | 3/2011 | Gildfind et al. ................ 710/29 |
| 8,291,056 B2 * | 10/2012 | Devarakonda et al. ....... 709/223 |
| 8,868,790 B2 * | 10/2014 | Lovett et al. .................. 709/250 |
| 8,931,054 B2 * | 1/2015 | Huynh et al. ..................... 726/3 |
| 8,938,554 B2 * | 1/2015 | Lu et al. ......................... 709/238 |
| 2002/0116645 A1 * | 8/2002 | Cloutier et al. ............... 713/201 |
| 2004/0143663 A1 * | 7/2004 | Leedom et al. ............... 709/226 |
| 2004/0205166 A1 * | 10/2004 | DeMoney ...................... 709/219 |
| 2005/0002331 A1 * | 1/2005 | Nolle et al. .................... 370/229 |
| 2005/0083749 A1 * | 4/2005 | Keohane et al. .............. 365/222 |
| 2006/0080319 A1 | 4/2006 | Hickman et al. | |
| 2006/0221990 A1 | 10/2006 | Muller et al. | |
| 2007/0081507 A1 * | 4/2007 | Koo et al. ...................... 370/338 |
| 2007/0255865 A1 | 11/2007 | Gaither | |
| 2008/0133706 A1 * | 6/2008 | Chavez et al. ................. 709/218 |
| 2008/0195796 A1 * | 8/2008 | Wang et al. .................... 711/102 |
| 2009/0248784 A1 * | 10/2009 | Cheston et al. ............... 709/201 |

* cited by examiner

*Primary Examiner* — Sargon Nano
(74) *Attorney, Agent, or Firm* — Schwegman Lundberg & Woessner, P.A.

(57) ABSTRACT

Network bandwidth is allocated to storage access requests as a function of a client system activities. Client system activities that produce network access requests and remote storage access requests are monitored. The network bandwidth allocation between network access requests and storage access requests is modified as a function of the monitored client system activities.

18 Claims, 2 Drawing Sheets

NETWORK BANDWIDTH CONTROL FOR NETWORK STORAGE

BACKGROUND

Some computer systems, such as diskless desktop personal computers utilize storage devices remote from them. The computers utilize a network to access a disk drive device or storage system as though the disk drive was local to the computer. Some computer systems use dedicated network connections to perform network reads/writes with acceptable performance. SCSI (small computer system interface) commands are sent over the network to the remote storage. This is sometimes referred to as internet SCSI or iSCSI. A dedicated network for iSCSI storage is independent of the data network and uses two ethernet ports on the desktop and duplication of network routers.

When an end user or application sends a request, the operating system generates the appropriate SCSI commands and data requests, which then go through encapsulation and, if necessary, encryption procedures. A packet header is added before the resulting IP packets are transmitted over an Ethernet connection. When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request.

iSCSI is one of two main approaches to storage data transmission over IP networks. An alternative method is called Fibre Channel over IP (FCIP), which translates Fibre Channel control codes and data into IP packets for transmission between geographically distant Fibre Channel SANs. FCIP (also known as Fibre Channel tunneling or storage tunneling) can only be used in conjunction with Fibre Channel technology; in comparison, iSCSI can run over existing Ethernet networks.

DETAILED DESCRIPTION

Figure 1:
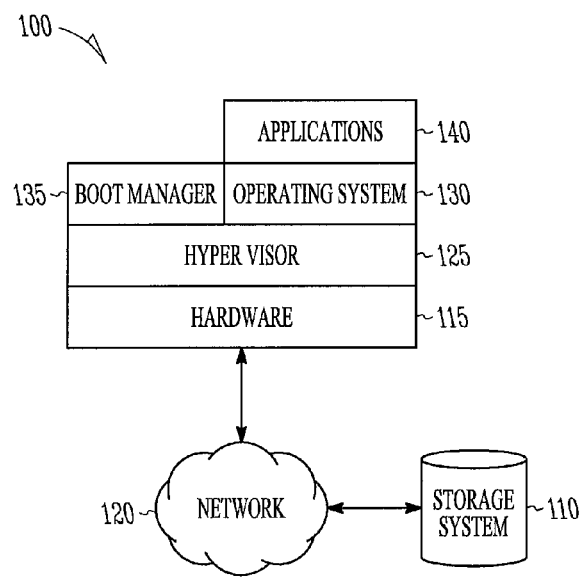
FIG. 1 is a block diagram illustrating the use of network storage to replace local storage for a client according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a machine, such as a digital signal processor, ASIC, microprocessor, or other type of processor operating on a computer system, such as a personal computer, server or other computer system.

A system and method of allocating bandwidth to remote storage accesses via a network is described. Activities of a client system are monitored, and network bandwidth allocation between storage requests and network requests is allocated as a function of such activities. The allocation of network bandwidth to remote storage access commands is increased during disk intensive activities, such as during boot processes, downloads, or while using applications in a foreground that are more likely to be disk intensive, such as a spreadsheet application. During network intensive activities, such as streaming video, less bandwidth may be allocated to remote storage access commands.

In one embodiment, storage access commands utilize iSCSI, which is Internet SCSI (Small Computer System Interface), an Internet Protocol (IP)-based storage networking standard for linking data storage facilities, developed by the Internet Engineering Task Force (IETF). In further embodiments, both different network protocols and storage access protocols, such as IDE or Fibre Channel may be used. iSCSI is used as an example that is representative of use of the other protocols.

By carrying SCSI commands over IP networks, iSCSI is used to facilitate data transfers over networks such as intranets, and to manage storage over long distances. It is a popular Storage Area Network (SAN) protocol, allowing organizations to consolidate storage into data center storage arrays while providing hosts (such as database and web servers) with the illusion of locally-attached disks. Unlike Fibre Channel, which uses special-purpose cabling, iSCSI can be run over long distances using existing network infrastructure. The iSCSI protocol is among the key technologies expected to help bring about rapid development of the storage area network (SAN) market, by increasing the capabilities and performance of storage data transmission. Because of the ubiquity of IP networks, iSCSI can be used to transmit data over local area networks (LANs), wide area networks (WANs), or the Internet and can enable location-independent data storage and retrieval.

FIG. 1 is a block diagram illustrating a client system 100 that uses of network storage 110 to replace local storage for a the client 100 according to an example embodiment. Network storage 110 may be an individual disk drive, a disk drive array or a storage area network or other type of storage in various implementations. Client hardware 115 is coupled to a network 120 that further connects the hardware 115 to the network storage 110. A functional layer, such as a hypervisor 125, is operably coupled to the hardware 115, such as by operating or running on the hardware 115. Function layer 125 in one embodiment, provides an interface to programs running on top of the hypervisor 125, such as an operating system 130 and boot manager 135.

While the hypervisor, operating system and boot manager are shown as discrete components in a particular arrangement, they may be arranged in many different ways. In some embodiments, software implementing hypervisor functions described below may be running in a separate virtual machine side by side with operating system software. Many other arrangements are possible. In one embodiment, the hypervisor is a very small operating system type component or module that knows how to deal with a virtual hard disk drive device such as storage system 110 and a network card, also represented by hardware 115. It effectively emulates a local hard disk drive to the operating system 130 in one embodiment, and includes appropriate services, such as drivers for hardware devices.

In some embodiments, applications 140 may be running on top of operating system 130 or other places within system 100. When an end user or application sends a storage request, the operating system generates the appropriate SCSI commands and data request as though the storage were local to the client system 100. The commands are then encapsulated and, if necessary, encrypted. A packet header is added before the resulting IP packets are transmitted via the hypervisor 125 over the network 120, such as via an Ethernet connection to the network, represented by hardware 115. When a packet is received by storage system 110, it is decrypted (if it was encrypted before transmission), and disassembled, separating the SCSI commands and request. The SCSI commands are sent on to a SCSI controller in storage system 110, and from there to a SCSI storage device.

Because iSCSI is bi-directional, the protocol can also be used to return data in response to the original request. If the response is not received consistent with timing associated with local storage request protocols in client 100, errors may be generated. These can be quite annoying to a user, and can result in delays, slowing down the performance of the client system 100. In some prior systems, a redundant network connection is used and dedicated entirely to disk accesses in an attempt to provide disk responses suitable to minimize such errors.

In one embodiment, client system 100 may be a machine, such as a computer system that executes programming for performing the above algorithms, and may include one or more processing units, memories, I/O devices, network cards, etc. A variety of computer-readable media, such as volatile memory and non-volatile memory, removable storage and non-removable storage may be included, or any other medium capable of storing computer-readable instructions that are executable by the processing unit or units of the computer.

Figure 2:
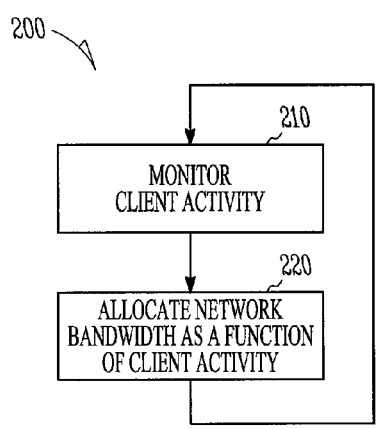
FIG. 2 is a flow chart illustrating a method of allocating network bandwidth to storage access requests according to an example embodiment.

In one embodiment, the hypervisor 125 monitors client activities, and allocates bandwidth between disk accesses and other network traffic, such as internet surfing, video streaming, etc. FIG. 2 is a flow chart illustrating a method 200 of allocating network bandwidth to storage access requests according to an example embodiment. At 210, client activity is monitored. This activity may include whether the client is booting to load one or more operating system, downloading new programs from storage, surfing the internet, displaying streaming video, or other network accesses. As a result of the activity monitoring, network bandwidth between disk accesses and network activity is allocated at 220. The network bandwidth is allocated as a function of client activity.

The resulting allocation is not a direct function of quality of service (QOS) in one embodiment. The allocation may be based on the activities being done by the client at the time of the allocation. In one embodiment, the process is continually repeated for each network request. In further embodiments, the process may repeat periodically at a desired time. In still further embodiments, the process may be triggered by a change in the activities being performed by the client, such as network intensive task being placed in a background window, or a download being initiated by the client. Thus, network bandwidth is modified while the activities are being performed, which includes just after a change in activities is requested or detected.

Figure 3:
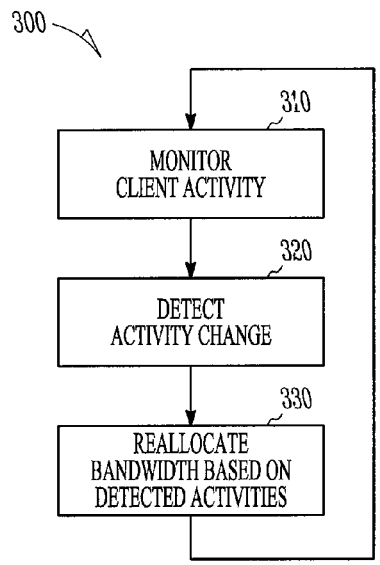
FIG. 3 is a flow chart illustrating a method of reallocating network bandwidth for storage access requests as a function of client activities according to an example embodiment.

FIG. 3 is a flow chart illustrating a method 300 of reallocating network bandwidth for storage access requests as a function of client activities according to an example embodiment. In an alternative embodiment, client activities are monitored at 310. At 320, an activity change is detected. At 330, the network bandwidth is reallocated as a function of the detected activities. In one embodiment, the allocation between network requests and storage requests may be initially allocated to default values. One such allocation results in 90% of the bandwidth being allocated to storage requests, and 10% allocated to network requests.

With a total network bandwidth of a gigabit per second or greater, this still provides plenty of bandwidth for network browsing. Upon the detection of booting of the client system 100, as detected at 320, the network allocation may be changed to 99% dedicated to storage access in order to efficiently load software and prepare the client system to run. This dedication may help prevent error conditions due to delays from occurring and speed the overall process of starting the client system 100 upon being powered on.

In a further embodiment, once the system is booted, the allocation may return to the default parameters if no activities are occurring that would be better served with a different allocation. If a video streaming application is being requested by the client system, the allocation may be changed to 50-50 by the hypervisor 125 at 330. In one embodiment, network allocation is related to the number of request via the hardware 115 that are allowed to be made for each type of request. In other words, if the allocation is 90% for storage accesses, nine out of 10 requests sent via the network should be for storage accesses. In some embodiments, the hypervisor may buffer requests and delay some requests in order to follow the allocation. Since TCIP is very forgiving of delays, up to 30 seconds in some embodiments, the delays may not be problematic for network requests. The identified percent allocations are for example purposes only, and may be varied significantly in further embodiments.

In one embodiment, different sets of activities may have predetermined allocations associated with them. For example, any time a boot is occurring, regardless of other activities, 99% of network bandwidth may be allocated to the storage accesses. Other percentages may be used if desired, and may depend on the overall bandwidth available. If a download from storage is occurring in a foreground, a certain allocation may be set. However, if the download is occurring in the background, coupled with internet surfing in the foreground of the client system 100, that allocation may be different. Still further, a download in the background, with video streaming in the foreground may result in yet a different allocation depending on perceived importance of each activity. Still further, if the video streaming is moved to the background and the download to the foreground, yet a different allocation may be done.

Generally, during high network activity and lower priority disk or storage accesses, higher bandwidth may be allocated to the network activity. During high priority storage accesses, such as booting, the allocation may be tilted in favor of storage accesses.

Figure 4:
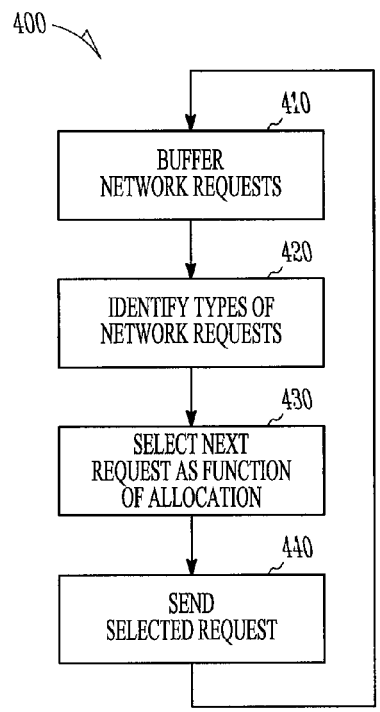
FIG. 4 is a flow chart illustrating a method of buffering and sending requests over a network according to an example embodiment.

FIG. 4 is a flowchart illustrating a method 400 of utilizing the network in accordance with network allocation. Network access requests, such as remote storage access and network access requests are buffered at 410. This continues even while other parts of the method 400 are executing. At 420, the different types of network requests are identified, such as whether a request is a storage access request or a network access request. At 430, a next request is selected as a function of the existing allocation, and at 440, the selected request is sent over the network. The process repeats at 430 to continuously identify next requests as a function of the network bandwidth allocation, and sending the selected requests. During these repeated identification and sending of requests, the allocation may be changed, and more network requests are buffered to identified as to type at 410 and 420. In some embodiments, selecting the next request may also be a function of priority, allowing overriding of the allocation if desired.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A machine implemented method comprising:
   allocating network bandwidth to storage access requests as a function of a network bandwidth allocation;
   monitoring client system activities that produce network access requests and remote storage access requests; and
   modifying the network bandwidth allocation between network access requests and storage access requests as a function of monitored client system activities;
   wherein a network bandwidth allocated to storage access requests is increased while a client system boot is occurring.

2. The method of claim 1 wherein greater than 90% of network bandwidth is allocated to storage access requests while a client boot is occurring.

3. The method of claim 1 wherein network bandwidth allocated to storage access requests is increased while a client system file download is occurring.

4. The method of claim 1 wherein network bandwidth allocated to network access requests is increased while video streaming is occurring.

5. The method of claim 1 wherein network bandwidth allocated to network access requests is increased in response to a user interface window associated with high storage access demand is placed in the background.

6. The method of claim 1 wherein requests are buffered and a next request to send via the network is selected from the buffer as a function of the monitored client system activities.

7. The method of claim 1 wherein the network bandwidth allocation is a function of multiple client system activities, and whether such client system activities are running in a foreground or background of the client system.

8. A machine implemented method comprising:
   providing a network connection to remote storage accessible to a local client using local storage access commands;
   allocating a predetermined amount of network bandwidth to the remote storage access;
   using local storage access commands to send remote storage access commands via the network;
   monitoring local client activities; and
   modifying the network bandwidth allocation to remote storage device access as a function of the monitored local client activities;
   wherein network bandwidth allocated to network access requests is increased in response to a user interface window associated with high storage access demand is placed in the background.

9. The method of claim 8 wherein network bandwidth allocated to storage access requests is increased while a client system boot is occurring.

10. The method of claim 9 wherein greater than 90% of network bandwidth is allocated to storage access requests while a client boot is occurring.

11. The method of claim 8 wherein network bandwidth allocated to network access requests is increased while video streaming is occurring.

12. The method of claim 8 wherein requests are buffered and a next request to send via the network is selected from the buffer as a function of monitored client system activities.

13. The method of claim 8 wherein the network bandwidth allocation is a function of multiple activities, and whether such activities are running in a foreground or background of the client system.

14. A storage device having instructions stored thereon for causing a machine to implement a method comprising:
   allocating network bandwidth to storage access requests as a function of a network bandwidth allocation; monitoring client system activities that produce network access requests and remote storage access requests; and
   modifying the network bandwidth allocation between network access requests and storage access requests as a function of monitored client system activities;
   wherein a network bandwidth allocated to storage access requests is increased while a client system boot is occurring.

15. The storage device of claim 14 wherein network bandwidth allocated to storage access requests is increased while a client system file download is occurring.

16. The storage device of claim 14 wherein network bandwidth allocated to network access requests is increased while video streaming is occurring.

17. The storage device of claim 14 wherein network bandwidth allocated to network access requests is increased in response to a user interface window associated with high storage access demand is placed in the background.

18. The storage device of claim 14 wherein requests are buffered and a next request to send via the network is selected from the buffer as a function of the monitored client system activities, and wherein the network bandwidth allocation is a function of multiple monitored system activities, and whether such monitored system activities are running in a foreground or background of the client system.

* * * * *